Aug. 7, 1945. O. JACOBSEN 2,381,544
DIAPHRAGM VALVE
Filed Oct. 4, 1943    2 Sheets-Sheet 1
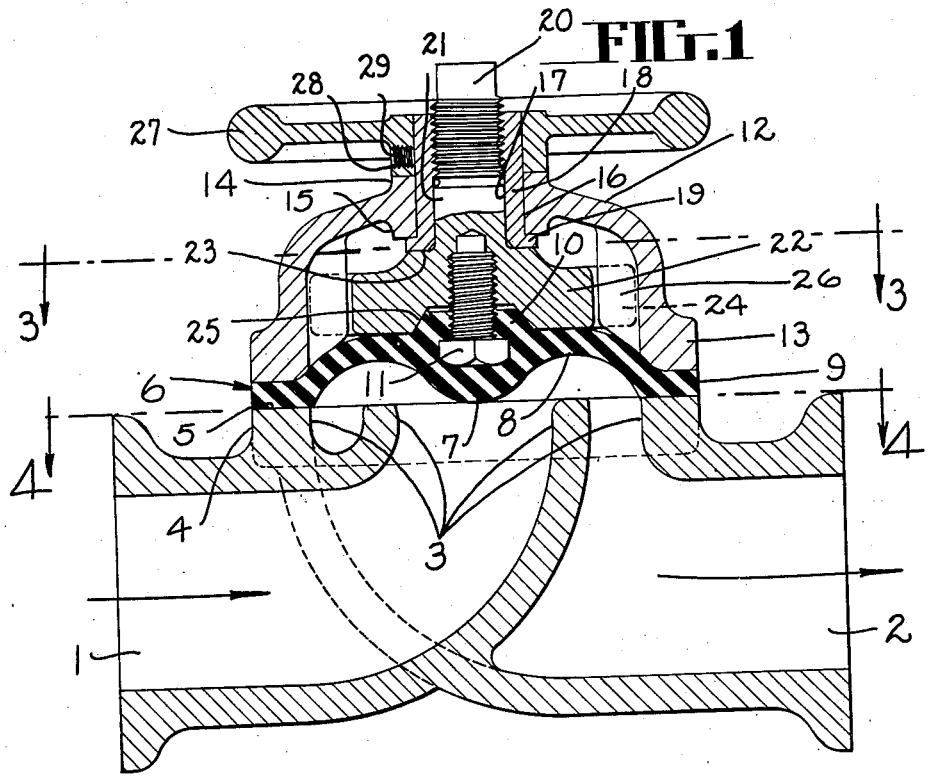
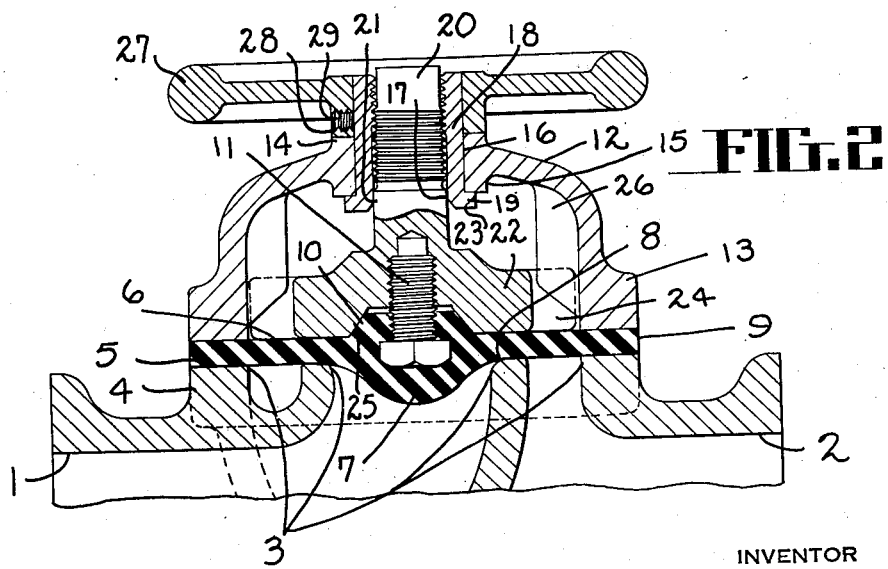
INVENTOR
OYSTEIN JACOBSEN
BY
Toulmin & Toulmin
ATTORNEY Aug. 7, 1945.   O. JACOBSEN   2,381,544
DIAPHRAGM VALVE
Filed Oct. 4, 1943   2 Sheets-Sheet 2
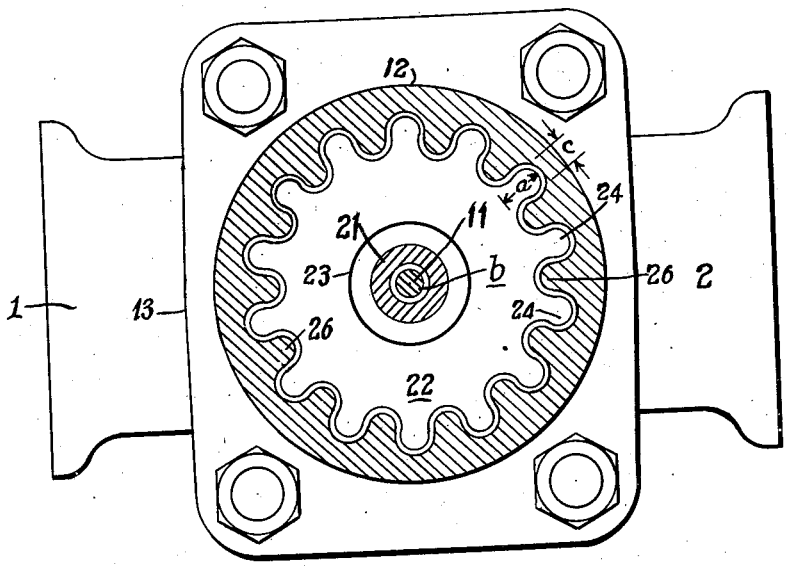
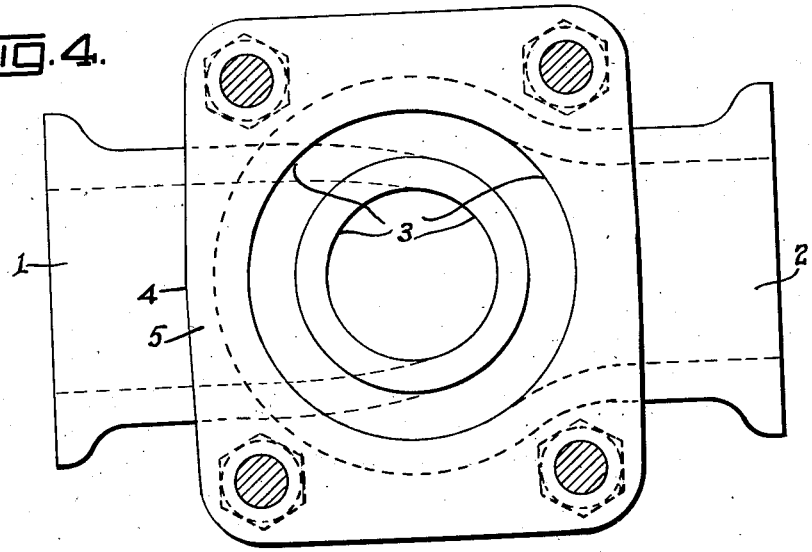
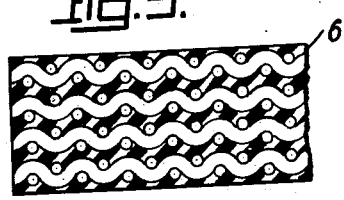
INVENTOR
OYSTEIN JACOBSEN,
BY
ATTORNEYS Patented Aug. 7, 1945

2,381,544

UNITED STATES PATENT OFFICE 2,381,544

DIAPHRAGM VALVE

Oystein Jacobsen, Montgomery County, Ohio, assignor to The Duriron Company, Inc., Dayton, Ohio, a corporation of New York Application October 4, 1943, Serial No. 504,828

1 Claim. (Cl. 251—24)

The present invention relates to valves of the type which employs an obturating member in the form of a flexible diaphragm to regulate the rate of flow of fluid through the valve.

A typical form of valve found on the maket and over which the present invention represents an improvement is constituted of a diaphragm, the outer peripheral edge of which is secured between the valve bonnet and the valve seat formed on the pipe body. The inner portion of the diaphragm is caused to flex from a concave position when the valve is open to a convex position when the valve is closed. When the diaphragm is in its concave or open position, the backing member consists of a plurality of bars spaced equidistantly from one another and which define a concave surface corresponding to the surface of the diaphragm. By flexing the diaphragm to the convex or closed valve position, a manually operated plunger is employed which carries a plurality of bars so spaced as to interleave with the bars of a supporting member so that if the plunger is forced downwardly the bars carried by the plunger cause the diaphragm to flex from a concave to a convex position.

It has been that when the ordinary or standard forms of flexible diaphragms are employed in valves of the type specifically referred to and particularly when the valve is moved quite often from the open to closed position and vice versa, the continual deflection of the diaphragm in moving from one extreme concave position to the other tends to shorten the life of the diaphragm. In extreme conditions and depending upon the specific construction of the diaphragm, the latter actually may be torn or otherwise subjected to damage to the extent that it may not lie fully and completely against its retaining surface so that obstruction to the flow of fluid through the valve or leakage past the valve can hardly be avoided.

Again, it has further been found that the use of bars or fingers of an elongate shape which extend practically entirely across the opening in the valve not only are unnecessary in the case of certain types of valves, but actually are a detriment to the operation thereof in that the space between the bars or fingers may, if the pressure to which the valve is subjected be fairly high, tend to give the diaphragm an irregular shape or otherwise cause distortion which often results in excessive wear on the diaphragm and therefore requires more frequent replacement of parts.

The primary object of the invention is to provide an improved form of plunger type valve in which the diaphragm is given no excessive movement or undue flexing either during the opening or closing operation of the valve, whereby the life of the diaphragm is greatly enhanced and its effectiveness in controlling fluid through the valve is accordingly increased.

Another object is to provide an improved backing member or structure for a diaphragm of this character and in which the backing structure is of a character as to eliminate any damaging effects on the diaphragm at high pressure without detracting in the slightest from the efficacy by which the diaphragm performs its valve-opening and valve closing functions.

Still another object is to provide a valve of the character described which requires only the simplest of parts including castings which may be readily assembled and in which all of the parts and more particularly the diaphragm will have a relatively long operating life.

These objects are attained in brief by providing a valve in which the diaphragm moves during the closing operation from a concave to a substantially flat position, the arrangement being such that notwithstanding the relatively small movement of the diaphragm a full discharge is permitted through the valve when open. The backing member for the most part, has a flat surface of continuous character, thereby eliminating the use of bars or fingers and the backing member terminates in a relatively short scalloped portion only sufficiently long to prevent radial movement of the backing member within the bonnet.

The invention will be better understood when reference is made to the following description and the accompanying drawings, in which:

Figure 1 represents a longitudinal section of the improved valve. The valve is shown in open position;

Figure 2 is very similar to the view shown in Figure 1 except that the valve has been moved to its closed position;

Figure 3 is a transverse sectional view taken along the line 3—3 in Figure 1, looking in the direction of the arrows;

Figure 4 is also a transverse sectional view taken along line 4—4 in Figure 1;

Figure 5 is a small fragmentary view of a portion of the diaphragm, highly magnified, to show specific details.

Referring more particularly to Figure 1, reference characters 1 and 2 represent respectively inlet and outlet conduits through which the passage of fluid is to be controlled by the improved form of valve. The inner or adjacent ends of the pipes 1 and 2 are brought together into a concentric arrangement so that one viewing the juncture between the pipes would see a pair of concentric edges indicated generally at 3, and the fluid passes over the inner edge and then between this edge and the outer edge to reach the outgoing pipe. If desired, the pipes at their juncture may be provided with a thickened portion as indicated at 4 to constitute a firm seat 5 for the valve.

The diaphragm generally designated at 6, when in open-valve position takes on a shape formed compositively of a central downwardly extending spherical portion 7 and a reversely extending curvilinear portion 8, terminating at its peripheral edge in a flat annular portion 9 which is approximately in line with the lowermost tip of the central spherical portion 7. The diaphragm is considerably thickened at its center by an upwardly extending conical portion 10 which receives a cap screw 11 for securing the diaphragm to its backing member.

Reference to Figure 2 will disclose that when the diaphragm is in its valve closed position all parts thereof except the central thickened portion is adapted to lie strictly flatwise. This represents an important feature of the present invention in that, as will be explained more in detail hereinafter, the amount of transverse movement which the diaphragm is caused to undergo from the fully opened to the fully closed position is extremely limited, and a given surface on the diaphragm is exposed to forces of the same compressional or tensional character whether the valve is in open or in closed position. This characteristic will be explained more in length after the remainder of the valve has been described.

The outer edge of the diaphragm 6 is held in position on the seat 5 by means of a bonnet 12 which is provided at its seat end with a peripherally enlarged portion 13. The outer and inner surfaces of the bonnet terminate in bosses 14, 15 which extend in opposite directions. These bosses form a hub member 16 which is provided with a centrally disposed opening 17 for receiving a liner or sleeve 18. The latter is provided at its lower end with an outwardly extending annular projection 19 which abuts the boss 15 and thus determines the vertical position of the sleeve within the bonnet.

The opening 17 is threaded in its upper end to receive the threaded shank 20 of a plunger 21 which carries a backing member 22 for the diaphragm. The latter may comprise a thick metal plate having a shoulder 23 which abuts the lowermost surface of the flange 19, and the plate may take on a general circular shape except that at its outer or peripheral edge a number of equidistantly spaced convolutions or scallops 24 may be provided. These scallops are shown more clearly in Figure 3, and as illustrated represent curvilinear recesses with the projections rounded off in a semi-circular fashion.

The depth $a$ of each scallop is considerably less than one-third of the distance between the center of the valve $b$ and the outermost point on the scallop, so that this depth is relatively small. The width $c$ of each scallop is substantially equal to the depth thereof or perhaps slightly less so that the configuration and dimensions of each scallop are such as to lend great strength to the projections and at the same time provide sufficient strength in the circumferential direction to accommodate strains that may be imposed upon the metal when the valve is subjected to high pressure fluids.

It will be seen from Figure 1 that the thickness of the scallops is the same as the thickness of the plate 22, so that the scalloped edge may be obtained readily by an ordinary moulding process. The plate may be provided with a counterbore having a conically shaped edge 25 of a size and shape snugly to receive the tapered projection 10 of the diaphragm 6. The plate is also provided at its center with a tapped opening for receiving the cap screw 11. It is apparent that when the screw 11 is in position and recalling that this screw is mounted or otherwise secured within the heavy body portion of the diaphragm 6 the latter is securely held against the backing member 22.

The lower surface of the backing member as well as the lower edges of the scallops 24 are substantially flat thus coinciding with the flat character of the rear face of the diaphragm 6, thus causing all parts of the diaphragm to take on a flat configuration when the valve is in closed position.

The bonnet 12 is provided at its inner surface and at equidistantly spaced positions about the surface with vertical lugs 26 which may be cast directly in the material of the bonnet. These lugs take curvilinear shapes corresponding to the shape of the scalloped edge of the backing member, and the scallops are of a size such as to permit the outer edge of the backing member loosely to enter the recesses formed by the lugs 26. The latter at their lower ends (as seen in Figure 1) are all given a tapered shape so as to conform with the shape of the rear face of the diaphragm 6 at positions near the inner surface of the bonnet.

Thus, as the backing member is withdrawn to its uppermost position as shown in Figure 1, the diaphragm is supported mainly by the flat front face of the backing plate 22 and also by the lower tapered edges of the curvilinear lugs 26, leaving practically no area whatsoever on the diaphragm which remains entirely unsupported. On the other hand, when the backing member 22 is moved downwardly by a mechanism which will be described, the scallops of the backing member are permitted readily to slide within the recesses formed by the lugs 26 so that when the lower surface of the diaphragm contacts the uppermost edge of the inlet conduit 1 the diaphragm is supported at its rear surface not only by the flat continuous face of the backing member 22 but also by the lower edges of the scallops 24. It will be noted in this respect that the upper edges of the pipe or conduit 1 are exactly in line with the upper edges of the pipe or conduit 2, so that the diaphragm 6 is caused to lie flatwise against the upper surface of both pipes.

It is apparent that when the valve is in open position, as shown in Figure 1, the central projection 7 together with the reversely extending curvilinear portions 8, cooperate to split the fluid at the center and to constrain this fluid to radially extending paths formed by the curved surfaces and so designed that the minimum friction and eddy-current loss are encountered. This condition can be readily discerned in Figure 1, and it will be noted in this respect that the paths extending outwardly from the splitter block 7 have parallel sides so as to avoid any throttling effect on the liquid.

It is also evident that in moving the diaphragm 6 from the position shown in Figure 1 to that shown in Figure 2, the diaphragm flexes in only one direction because it never passes from a concave to a convex position or vice versa; it merely moves from a concave to a straightened position. The net result of this type of movement is that the diaphragm is always subjected to the same character of stress by the pressure of the controlled fluid or by the pressure exercised by the backing member whether these stresses be compressional or tensional. In the specific case shown, the backing member side of the diaphragm is subjected to tension while the opposite side is in compression and these stresses remain of the same character regardless of whether the valve is in open or closed position.

The diaphragm is usually constituted of a rubberized fabric (shown in Figure 5) consisting of one or more layers of woven material connected together and coated on both surfaces with rubber. A continual flexing of the diaphragm from a concave to a convex position and vice versa obviously tends to separate the woven layers from the rubber coating so that a short life of the diaphragm could be expected with consequent failure of the valve. However, by designing the structure of the valve in such a way that the diaphragm moves only from a concave or convex position to a straight position the individual parts of the diaphragm are not flexed or distorted to anywhere near the same degree as they would be if the diaphragm were moved from the extreme concave position to the extreme convex position.

Another advantage of the improved valve over those employed in the prior art is that the scallops 24 and 26 are of a "stubby" character so that great strength is thereby imparted to the coacting elements during the closing and opening operations of the valve and there can be no tendency for these scalloped elements to break even though fluids of great pressure are being handled by the valve. It will be understood in this connection that sometimes these fluids when passing through the valve have a strong circular action which unless successfully withstood may impart a circular stress not only to the valve 6 but also to the backing member 22. These stresses are so great that valves of the prior art have actually provided bars on the backing member and on the bonnet which inter-mesh throughout their length, i. e., across the internal diameter of the bonnet. However, it will be appreciated that by reason of the increased length of these bars their resistance to a transverse force, particularly when imparted at the middle is severely reduced, so that the bars tend to fracture fairly easily. But by the use of the short stubby type of scallops (as shown in Figure 3), these elements which prevent rotation of the diaphragm and backing member have great strength in the transverse or thickness direction without reducing in any appreciable amount their ability for preventing the diaphragm and backing member from rotating with respect to the remainder of the valve.

For operating the backing member I may provide a hand-wheel which has a hub 28 and is secured to the liner 18 by means of a headless set screw 29. It is apparent that as the hand-wheel is rotated the liner 18 is also turned with respect to the plunger 21 to cause the latter to reciprocate within the liner and thus control the opening and closing operations of the valve.

While the apparatus herein disclosed and described constitutes a preferred form of the invention, yet it is to be understood that the apparatus is capable of mechanical alteration without departing from the spirit of the invention and that all such modifications as follow within the scope of the appended claim are intended to be included herein.

Having thus fully described my invention, what I claim as new and desire to secure by Letters Patent is:

A valve for controlling the flow of liquid through a plurality of pipe portions presenting concentrically arranged flat surfaces at the valve seat, said valve including a bonnet having internal flutes, a flexible diaphragm for said valve, said diaphragm having a depending central spherical projection, and a flat backing member for the diaphragm, said member being provided with peripheral projections which extend into the spaces between the flutes of the bonnet, said member being adapted to move toward and away from the seat of the valve in order to cause the diaphragm to close and open the openings in the pipe portions, the lower edges of the flutes being inclined downwardly and away from the backing member when the valve is in open position and cooperating with the flat portion of the backing member to form a seat for the diaphragm under valve-open conditions and permit the diaphragm to have an annular concave recess on the underside of the diaphragm, the surface of said recess merging into that of said central projection to guide the liquid flowing outwardly from the valve seat in all directions.

OYSTEIN JACOBSEN.